US010233865B2

(12) United States Patent
Prstojevic et al.

(10) Patent No.: US 10,233,865 B2
(45) Date of Patent: Mar. 19, 2019

(54) PISTON CROWN HAVING CONICAL VALVE POCKET

(71) Applicant: MAHLE International GmbH, Stuttgart (DE)

(72) Inventors: Snjezana Prstojevic, Farmington Hills, MI (US); Giang Nguyen, Northville, MI (US)

(73) Assignee: MAHLE International GmbH, Stuttgart (DE)

( * ) Notice: Subject to any disclaimer, the term of this patent is extended or adjusted under 35 U.S.C. 154(b) by 103 days.

(21) Appl. No.: 15/282,143

(22) Filed: Sep. 30, 2016

(65) Prior Publication Data
US 2018/0094604 A1 Apr. 5, 2018

(51) Int. Cl.
F02F 3/00 (2006.01)
F02F 3/28 (2006.01)
F02F 3/26 (2006.01)
B23C 3/00 (2006.01)
F02B 23/06 (2006.01)

(52) U.S. Cl.
CPC .............. F02F 3/28 (2013.01); B23C 3/00 (2013.01); F02B 23/06 (2013.01); F02F 3/26 (2013.01); B23C 2215/242 (2013.01); B23C 2220/04 (2013.01)

(58) Field of Classification Search
CPC ...... F02F 3/28; F02F 3/26; F16J 1/001; B23C 3/00; B23C 2220/04; B23C 2215/242
See application file for complete search history.

(56) References Cited

U.S. PATENT DOCUMENTS

| 2,991,780 | A | | 7/1961 | Brien |
| 3,052,960 | A | | 9/1962 | Burrell |
| 4,635,597 | A | * | 1/1987 | Ohashi ............... F02B 23/0651 123/263 |
| 5,285,755 | A | * | 2/1994 | Regueiro ............... F01L 1/26 123/193.6 |
| 5,417,189 | A | | 5/1995 | Regueiro |
| 6,129,070 | A | | 10/2000 | Jingu et al. |
| 9,670,829 | B2 | * | 6/2017 | Bowing ............. F02B 23/0639 |
| 2013/0239925 | A1 | | 9/2013 | Karch et al. |
| 2014/0238333 | A1 | | 8/2014 | Hirsch |
| 2015/0107559 | A1 | | 4/2015 | Böwing et al. |
| 2016/0186687 | A1 | | 6/2016 | Minooka |

FOREIGN PATENT DOCUMENTS

| DE | 85 21 358 U1 | 2/1987 |
| EP | 0 845 589 A1 | 6/1998 |
| WO | 2015087137 A2 | 6/2015 |

* cited by examiner

Primary Examiner — Richard Chang
(74) Attorney, Agent, or Firm — Collard & Roe, P.C.

(57) ABSTRACT

A piston has a piston crown and a top land extending circumferentially around the piston crown, as well as a combustion bowl and at least one valve pocket machined therein. The valve pocket has a side wall and a bottom, and wherein the side wall extends at an angle of between 110° and 120° from the bottom. A method for forming such valve pockets in the piston crown includes machining the valve pockets with a rotating cutter having an inverted frustoconical shape such that an angle between a bottom of the cutter and a side wall of the cutter amounts to between 110° and 120°.

9 Claims, 5 Drawing Sheets

PISTON CROWN HAVING CONICAL VALVE POCKET

BACKGROUND OF THE INVENTION

1. Field of the Invention

This invention relates to a piston having a crown with valve pockets that are cut via a cutter having a frustoconical rather than a cylindrical contour. This way, the valve pocket for both the intake and exhaust valves can be cut with the same cutter, and a maximum amount of piston material is preserved.

2. The Prior Art

Valve pockets are usually cut into the crowns of pistons to allow the intake and exhaust valves to extend into the combustion chamber and allow clearance between the valve and the piston. The pockets are usually cut by a rotating cutting device having a cylindrical contour. The cutting device cuts into the piston crown, either straight on or at an angle, to create the pocket or recess. The problem with the use of the cylindrical cutter is that even with an angled cut, too much of the crown is removed narrowing the distance to the first ring groove, reducing the strength and durability of the piston. In addition, with a cylindrical cutter, two different cutters are required to machine the intake and exhaust pockets, due to the variation in the size and clearance required by each of the intake and exhaust valves are different. This is inconvenient and expensive.

SUMMARY OF THE INVENTION

It is therefore an object of the invention to provide a piston crown and method where the valve pockets are cut with a maximum amount of piston material left between the valve pocket and the first ring groove. It is another object of the invention to provide a piston crown and method where the valve pockets for the intake and exhaust can be cut with the same cutting tool, while still maximizing the amount of piston material between the pocket and the first ring groove.

These and other objects are accomplished according to the invention by a piston having piston crown with a combustion bowl and a top land extending circumferentially around the piston crown. There is at least one valve pocket machined into the piston crown for receiving intake and/or exhaust valves. The valve pocket is formed by a curved side wall and a bottom wall, with the side wall extending at an angle of between 110° and 120°, and preferably between 111° and 118° from the bottom wall. Previous pistons all have the side wall extending 90° from the bottom wall. By extending the size of the angle, the valve pocket of the invention does not have to extend as deeply into the piston as prior art valve pockets having the traditional 90° angle, and yet still has a sufficient width to accommodate both intake and exhaust valves. This geometry also allows the height of the top land to be made as small as possible yet maintaining the strength and durability of the piston by increasing the distance between the valve pocket and the first ring groove.

In one embodiment, there are four valve pockets, each pocket being the same size and having the same side wall angle. Even though the intake and exhaust valve may have different sizes the added clearance created by the side wall angle allows for common valve pocket dimensions. Thus, a single cutting tool can be used to create all four valve pockets in the piston, which makes manufacturing easier and less expensive.

Preferably, the bottom wall of the pocket is disposed at an angle to the top of the piston. This angle can be characterized as being between 70°-80° from a piston center axis, and preferably between 73°-77° from the piston center axis. When the pocket is disposed at an angle, the bottom wall extends up until it meets the piston crown, and the side wall thus extends only partially around the piston crown. In one embodiment, the side wall of the pocket can extend through the top land, at least in some portion of the pocket.

Because the pocket can be made to be much shallower than a traditional pocket having a 90° angle, the height of the top land can be made smaller, and thus a ratio of the height of the top land to the piston diameter can be lower than with traditional pistons. In one form of the present invention, the ratio of the height of the top land to the diameter of the piston amounts to between 0.05:1 to 0.07:1.

In addition, the ratio of the depth of the pocket to the piston diameter can also be made lower. In the invention, the ratio of the depth of one valve pocket to the diameter of the piston amounts to between 0.03:1 to 0.05:1.

The invention also relates to a method for forming such valve pockets in the piston crown. The method involves machining the valve pockets with a rotating cutter, the cutter having an inverted frustoconical shape such that an angle between a bottom of the cutter and a side wall of the cutter amounts to between 110° and 120° and preferably between 111° and 118°. Preferably, the cutter is applied to the piston crown at an angle such that the bottom of the cutter is disposed tilted relative to a top surface of the piston crown, and preferably arranged so that it creates angle with the piston center axis of 73°-77°. Four valve pockets can be machined into the piston crown in this way, with the valve pockets being spaced equally around the piston crown. In other forms, the intake and exhaust valve pockets may be cut to different sizes when advantageous for the specific engine application or operating characteristics.

In addition, each of the valve pockets is machined such that the side wall of each valve pocket extends through a top land of the piston, at least in a portion of the pocket. The method according to the invention is much simpler and more cost-effective than prior methods, because in one form the same cutter can be used to machine all of the valve pockets. In prior methods in which the cutter is cylindrical in shape, the valve pockets for the intake valves are machined with a different cutter than the pockets for the exhaust valves, as the intake valves usually require a larger pocket, but machining the larger pocket for the exhaust valves using the traditional cutter removes too much of the piston material. The varying size between the intake and exhaust valves using the traditional cutter would be best for the strength of the piston to use the smallest diameter cutter needed to attain an operating clearance between the piston crown and the valves.

The method according to the invention allows for maximum valve clearance while also maximizing the piston material remaining between the pocket and the first ring groove of the top land.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE EMBODIMENTS

Figure 1:
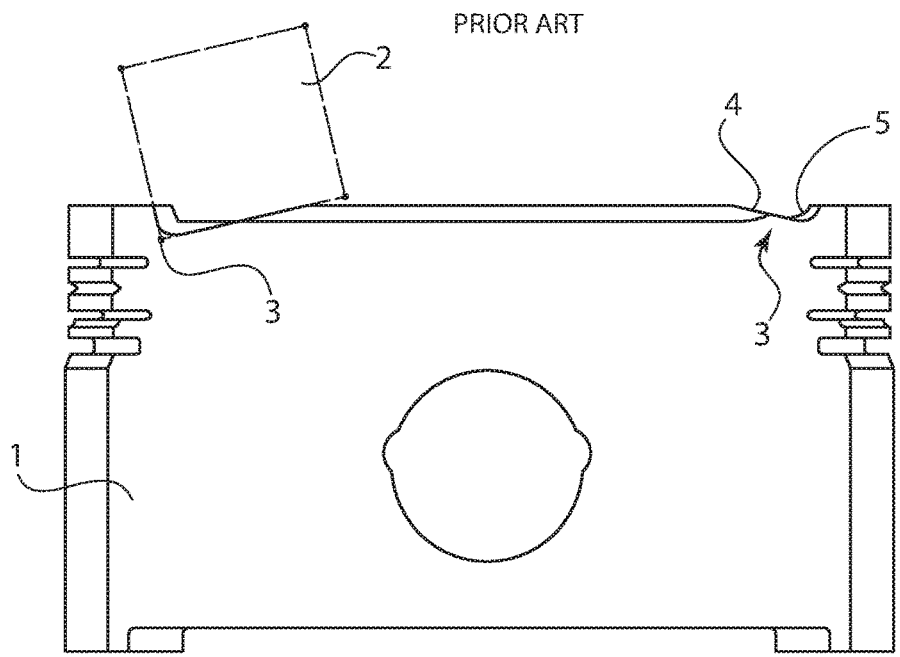
FIG. 1 shows a view of a piston having a valve pocket cut with a cutting method according to the prior art.

FIG. 1 shows a prior art piston 1 and method for cutting valve pockets into the piston. In the method, a cutting tool 2 having a cylindrical shape, i.e., with an angle of about 90° between the bottom and side wall, is used to cut the individual valve pockets 3, which each have a bottom 4 and side wall 5. As will be discussed below, the pockets created with such a cutter are unnecessarily deep and remove more piston material than necessary to accommodate the valve.

Figure 2:
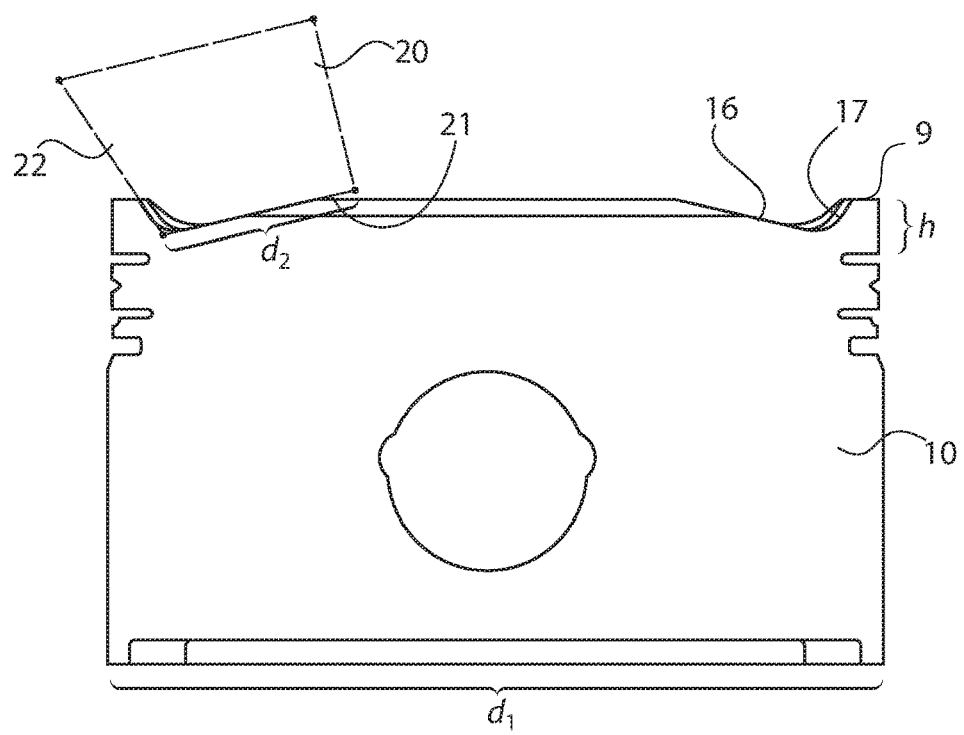
FIG. 2 shows a piston having a valve pocket cut with a cutting method according to the invention.

FIG. 2 shows a similar view of a piston 10 in which valve pockets are cut using the method according to the invention. Here, a cutter 20 having a bottom 21 and a side wall 22 is placed on the crown 9 of piston 10, and a pocket 15 is cut into the crown 9 of piston 10. Pocket 15 has a side wall 17 and a bottom surface 16. Because of the inverted frusto-conical shape of cutter 20, both the cutter 20 and the pocket 15 form an angle of between 110° and 120° between the side wall 17, 22 and the bottom surface 16, 21, and preferably an angle of between 111° and 118°.

Figure 3:
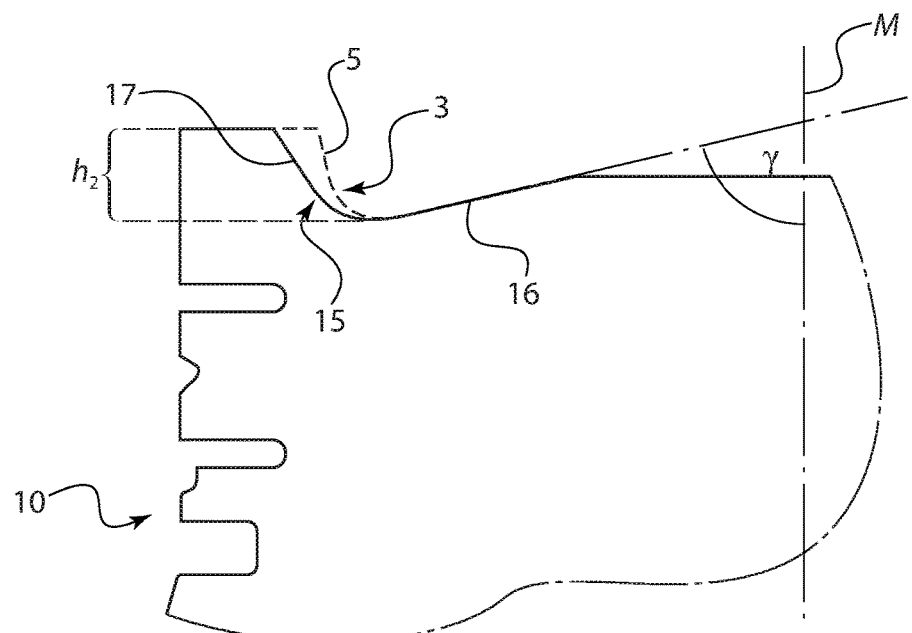
FIG. 3 shows an enlarged view of a valve pocket in the piston according to the invention, with the prior art valve pocket being drawn in broken lines for comparison.

The difference in shape between the pocket 15 of the invention and a pocket 3 according to the prior art are shown in FIG. 3. As can be seen there, pocket 15 has a much wider clearance than pocket 3, due to the angled sidewall 17.

The valve pocket 15 is formed by disposing the cutter at an angle, so that the angle between the bottom 16 of pocket 15 and a piston center axis M is between 70° and 80°, and preferably between 73° and 77°. Other angles could also be used.

Figure 4:
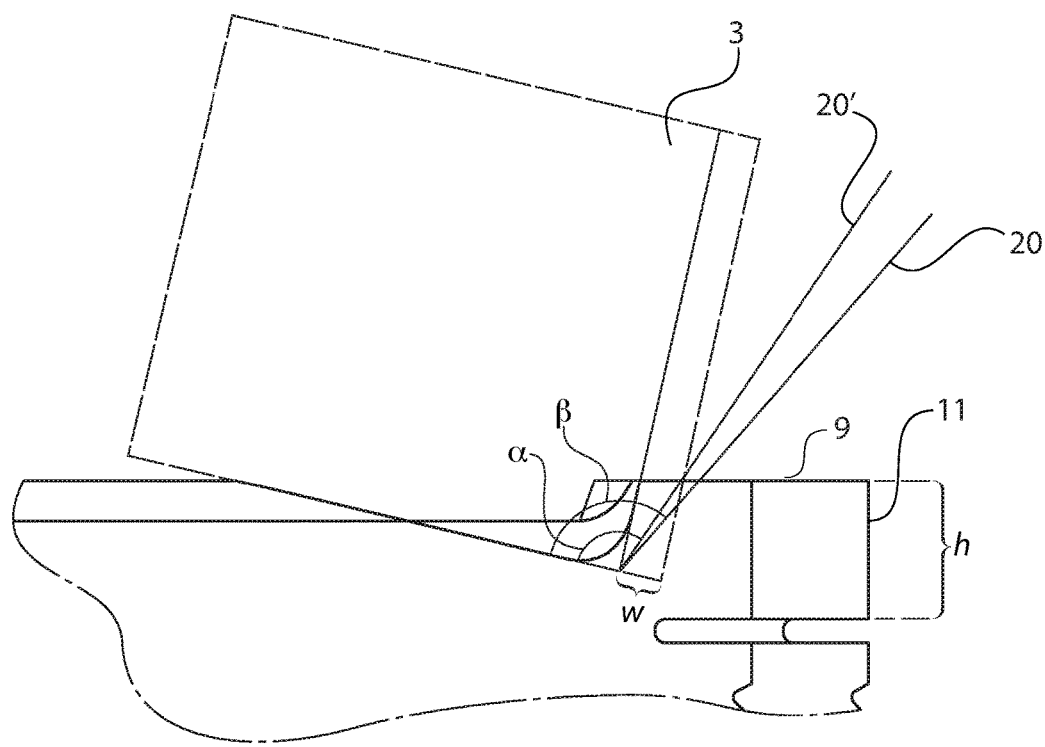
FIG. 4 shows several different cutting tools cutting into a piston to form the valve pocket according to the invention, in comparison with a cutter according to the prior art.

FIG. 4 shows the practical advantages of the pocket 15 and cutter 20 of the invention over the prior art. Using a traditional cutter 3, a person would have to cut farther into the piston 10 by a distance w in order to achieve the clearance in the piston crown that is achieved by a cutter 20' having an angle α between the side wall and bottom of 111°. If an angle β of 118° is used instead as indicated by cutter 20 in FIG. 4, then the difference between the cuts required by the prior art cutter 5 and the cutter 20 according to the invention are even greater.

The specific angles of the cutter 20, 20' allow the piston 10 to achieve specific ratios that are not possible using the prior art cylindrical cutter 5. For example, as shown in FIG. 2, in the piston according to the invention, the ratio between the height h of the top land 11 and the piston diameter $d_1$ can be optimized between 0.05:1 to 0.07:1. With the prior art, much larger ratios are required in order to avoid compromising the integrity of the piston by reducing the distance between the valve pocket and the first ring groove. In addition, the ratio of the depth of the piston pocket $h_2$ to the piston diameter can be in the range of 0.03:1 to 0.05:1. Valve pockets according to the prior art require much larger ratios in order to achieve the necessary valve clearance. Finally, the ratio between the radius of the cutter and the piston diameter can be between 0.18:1 to 0.24:1.

Figure 5:
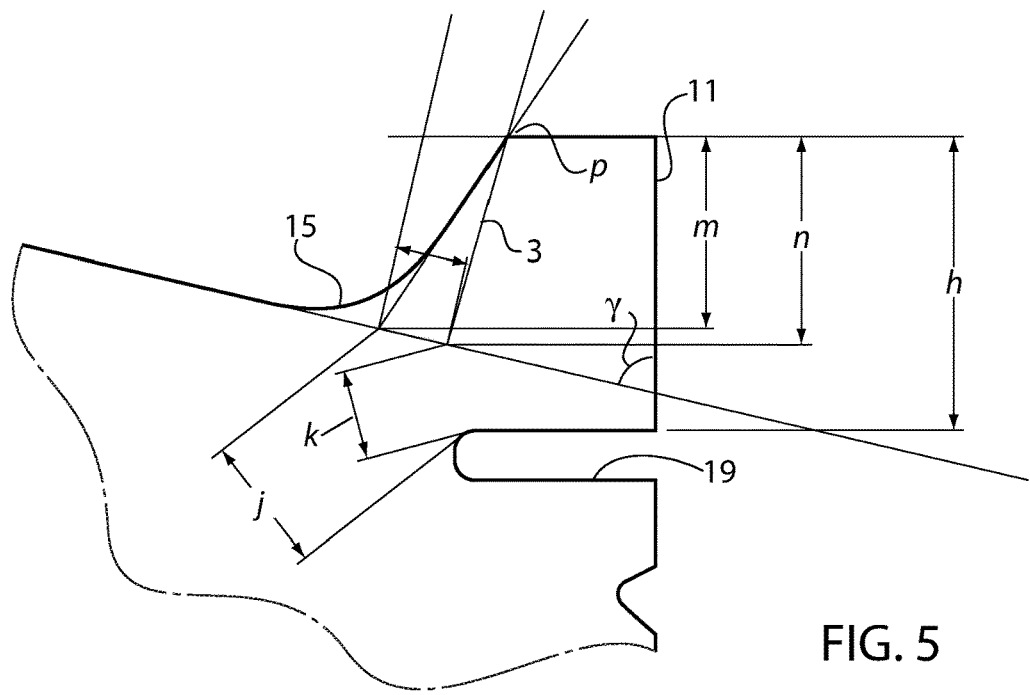
FIG. 5 shows another view of the valve pocket of the invention in comparison with a prior valve pocket.

FIG. 5 shows another view of the valve pocket 15 according to the invention in comparison with a prior art valve pocket 3, which share the same tilt angle γ and boundary p at the top of the piston. As can be seen by the comparison between distance j and k, the prior art valve pocket formed from a cylindrical cutter extends much farther into the piston and thus much closer to the first ring groove 19, thus weakening the piston. Distance j is approximately 1.5 times greater than distance k, leading to a much stronger and more durable piston. In addition, the height h of the top land 11 can be made smaller if needed using the valve pocket according to the invention. The depth of the valve pocket to the height of the top land of the piston is generally in a ratio of about 1:1.5. The difference between the depth m of the valve pocket 15 of the invention and the depth n of the prior art pocket having the same boundary p and tilt angle γ is significant, as the depth m can be smaller by at least 8%. Thus, by using a conical cutter to form the valve pocket where the angle between the side wall and bottom is over 110°, significant advantages in piston strength and performance can be achieved. In addition, the depth of the valve pocket m using the invention allows for a higher ratio of the minimal distance j, between the bottom surface of the valve pocket to the first ring groove 19. In one form this ratio of distances m:j is approximately within a range of 0.3 to 1.0, which is significant especially in pistons that have a shorter top land height h, and in another form the m:j ratio is targeted to be about 0.7.

Figure 6:
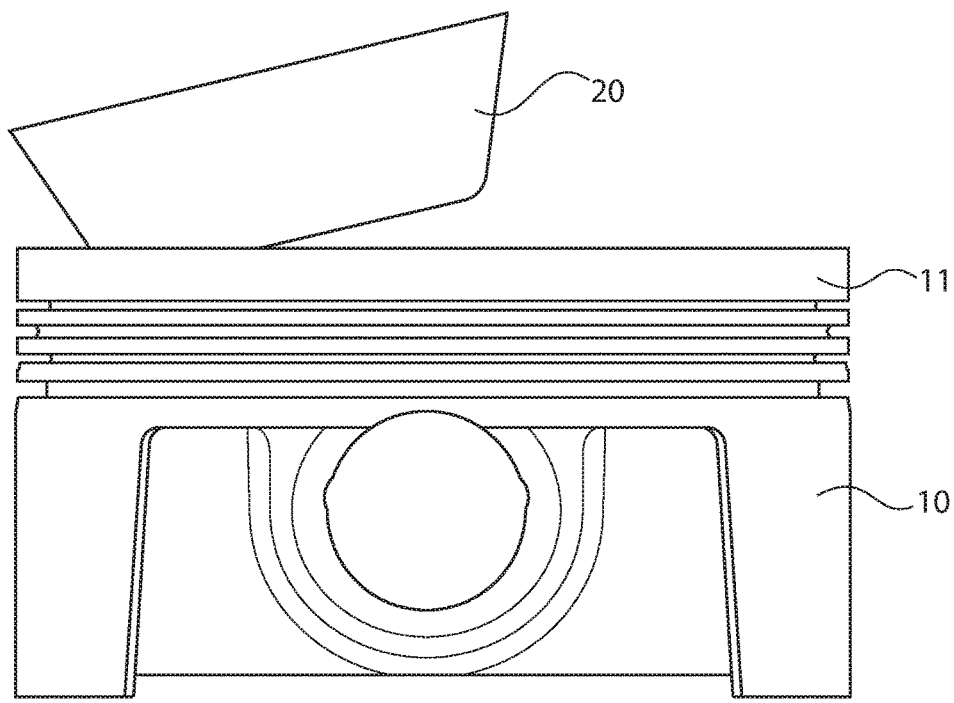
FIG. 6 shows a complete piston and cutter according to the invention in a cutting process.
Figure 7:
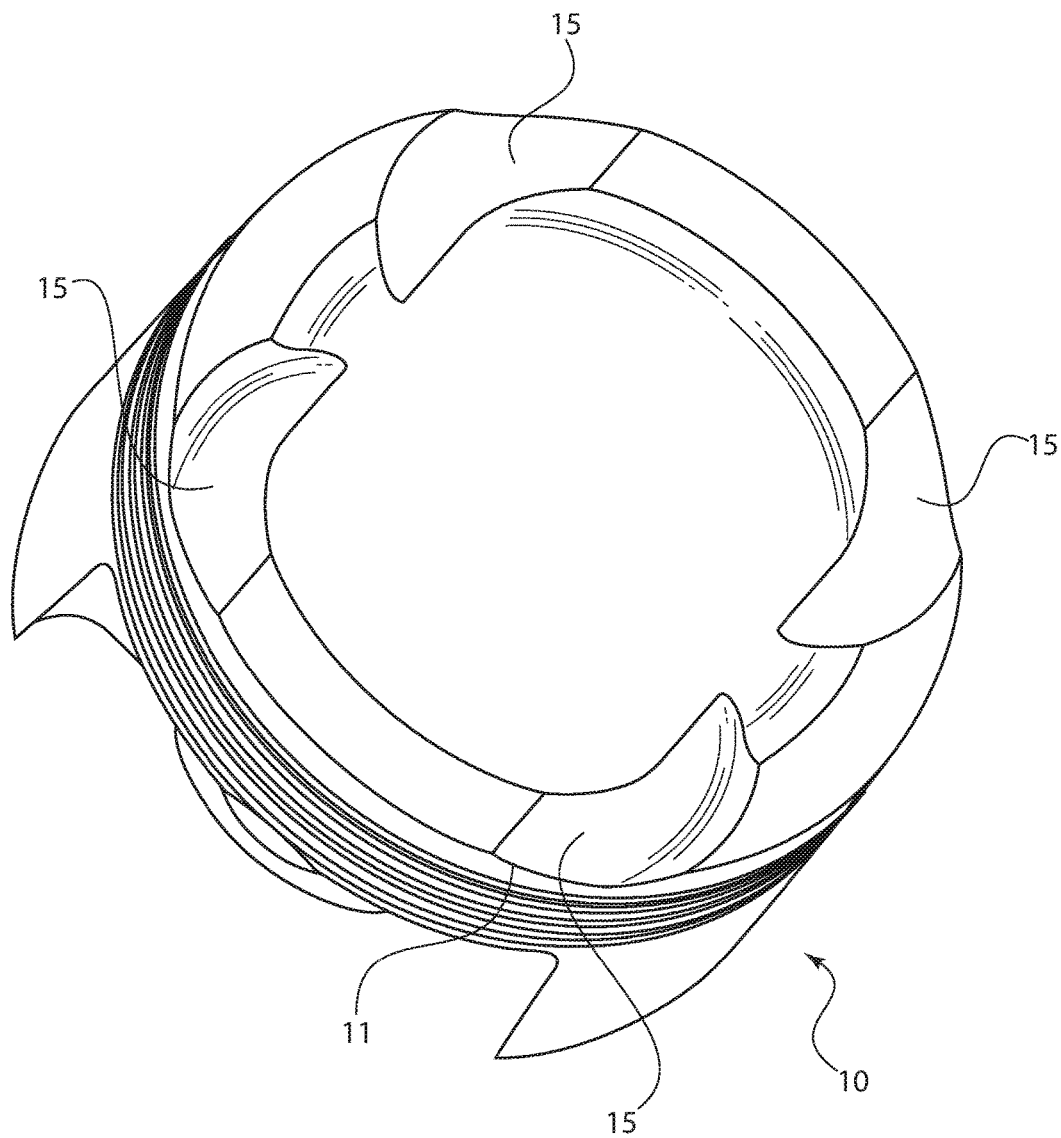
FIG. 7 shows a top view of the piston according to FIG. 6, with four valve pockets cut therein.
Figure 8:
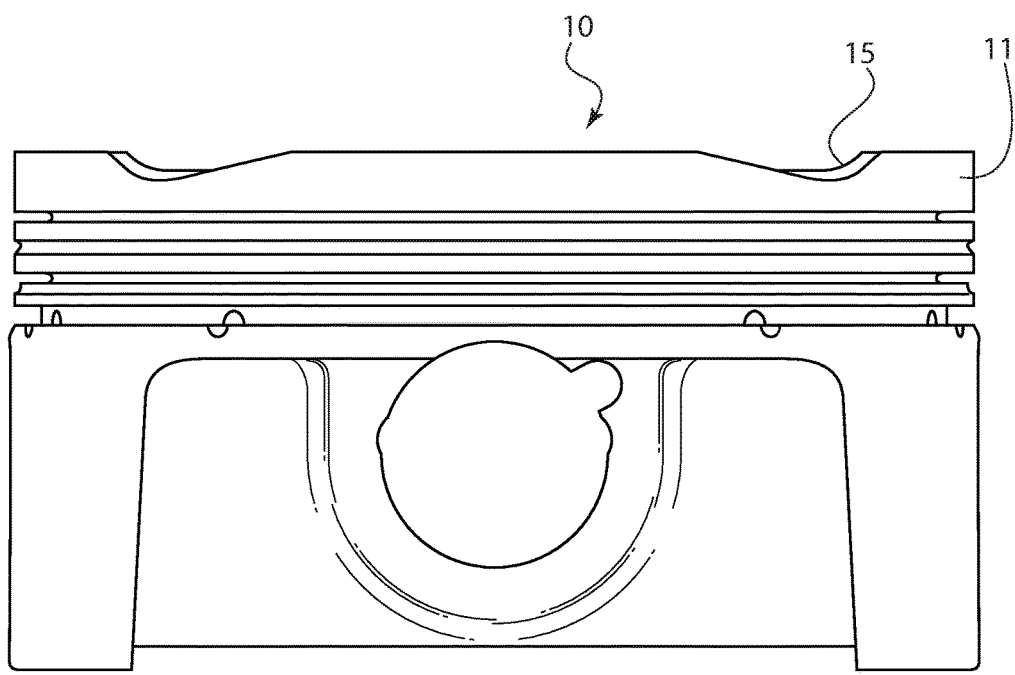
FIG. 8 shows a front view of the piston according to FIG. 7.

FIGS. 6-8 show the entire piston 10 according to the invention both during the cutting process (FIG. 6) and after completion (FIGS. 7-8). Cutter 20 can be used to cut all four valve pockets 15 shown in FIG. 7, rather than having to change out the cutter between intake and exhaust pockets. As shown in FIG. 7, the pockets 15 are hemispherical in shape and can extend through the top land 11 of the piston in certain areas.

Accordingly, while only a few embodiments of the present invention have been shown and described, it is obvious that many changes and modifications may be made thereunto without departing from the spirit and scope of the invention.

What is claimed is:
1. A piston comprising:
a piston crown and a top land extending circumferentially around the piston crown, the piston crown having a combustion bowl and at least one valve pocket machined therein,
wherein the at least one valve pocket has a side wall adjacent the top land and a planar bottom wall extending toward a center of the piston crown, and wherein the side wall extends outwardly from the bottom wall at an angle of between 110° and 120° from the bottom wall such that an upper portion of the side wall is closer to the top land than a portion of the side wall adjacent the bottom wall, and wherein the bottom wall extends upwardly toward the center of the piston crown, wherein the at least one valve pocket extends outwardly to expose a side portion of the top land.

2. The piston according to claim 1, wherein there are four valve pockets, each pocket being the same size and having the same side wall angle.

3. The piston according to claim 1, wherein the bottom wall is disposed at an angle of between 70°-80° from a piston center axis.

4. The piston according to claim 3, wherein the bottom wall is disposed at an angle of between 73°-77° from a piston center axis.

5. The piston according to claim 1, wherein the side wall extends at an angle of between 111° and 118° from the bottom wall.

6. The piston according to claim 1, wherein the at least one valve pocket extends into the top land.

7. The piston according to claim 1, wherein a ratio of a height of the top land to a diameter of the piston amounts to between 0.05:1 to 0.07:1.

8. The piston according to claim 1, wherein a ratio of a depth of the at least one valve pocket to a diameter of the piston amounts to between 0.03:1 to 0.05:1.

9. The piston according to claim 1, wherein a ratio of a depth of the at least one valve pocket to a height of the top land amounts to approximately 1:1.5.

* * * * *